(12) United States Patent
Kim et al.

(10) Patent No.: US 8,896,271 B2
(45) Date of Patent: Nov. 25, 2014

(54) BATTERY PACK CAPABLE OF PREVENTING BATTERY CELL FROM HIGH-TEMPERATURE SWELLING AND METHOD THEREOF

(75) Inventors: Youngu Kim, Yongin-si (KR); Woojin Lee, Yongin-si (KR); Yonggeol Kwon, Yongin-si (KR); Kisung Hong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 547 days.

(21) Appl. No.: 12/947,811

(22) Filed: Nov. 16, 2010

(65) Prior Publication Data

US 2011/0121787 A1 May 26, 2011

(30) Foreign Application Priority Data

Nov. 26, 2009 (KR) .................. 10-2009-0115143

(51) Int. Cl.
| | |
|---|---|
| *H02J 7/00* | (2006.01) |
| *H01M 10/48* | (2006.01) |
| *H01M 10/44* | (2006.01) |
| *H01M 10/46* | (2006.01) |
| *H01M 10/0525* | (2010.01) |

(52) U.S. Cl.
CPC ........ *H01M 10/443* (2013.01); *H01M 10/0525* (2013.01); *H01M 10/488* (2013.01); *Y02E 60/12* (2013.01); *H02J 7/0031* (2013.01); *H01M 10/46* (2013.01); *H01M 10/486* (2013.01)
USPC .......................................... 320/136; 320/152

(58) Field of Classification Search
USPC .................. 320/132, 134, 136, 152
See application file for complete search history.

(56) References Cited

U.S. PATENT DOCUMENTS

| | | |
|---|---|---|
| 5,945,803 A | 8/1999 | Brotto et al. |
| 2004/0162698 A1 | 8/2004 | Iwaizono |
| 2004/0167741 A1 | 8/2004 | Iwaizono |
| 2005/0029990 A1* | 2/2005 | Tsukamoto et al. .......... 320/135 |
| 2006/0076926 A1 | 4/2006 | Lee |
| 2008/0091364 A1* | 4/2008 | Lim et al. ........................ 702/63 |

(Continued)

FOREIGN PATENT DOCUMENTS

| | | |
|---|---|---|
| EP | 1-096-637 A1 | 5/2001 |
| JP | 2000-270494 A | 9/2000 |

(Continued)

OTHER PUBLICATIONS

Extended European Search Report dated Jan. 17, 2011 issued by the European Patent Office for EP 10-192680.6 which corresponds to Korean Patent Application 10-2009-0115143, 8 pages.

(Continued)

*Primary Examiner* — Edward Tso
*Assistant Examiner* — Aaron Piggush
(74) *Attorney, Agent, or Firm* — Christie, Parker & Hale, LLP (57) ABSTRACT

A method for protecting a battery cell from high-temperature swelling, the method includes: sensing a temperature and a voltage of the battery cell; determining whether the sensed temperature of the battery cell exceeds a reference temperature; determining whether the sensed voltage of the battery cell exceeds a reference voltage, when the sensed temperature of the battery cell exceeds the reference temperature; and self-discharging the battery cell in a charge/discharge/standby mode when the sensed voltage of the battery cell exceeds the reference voltage.

18 Claims, 6 Drawing Sheets

(56) References Cited

U.S. PATENT DOCUMENTS

| | | |
|---|---|---|
| 2008/0116852 A1 | 5/2008 | Kuo |
| 2009/0072793 A1 | 3/2009 | Chang et al. |
| 2009/0085519 A1 | 4/2009 | Kim |

FOREIGN PATENT DOCUMENTS

| | | |
|---|---|---|
| JP | 2000-308274 | 11/2000 |
| JP | 2001-043902 | 2/2001 |
| JP | 2002-56900 | 2/2002 |
| JP | 2002-141112 | 5/2002 |
| JP | 2009-044823 | 2/2009 |
| KR | 10-2006-0028174 A | 3/2006 |
| KR | 10-2006-0034131 A | 4/2006 |
| KR | 10-2006-0106336 A | 10/2006 |
| KR | 10-2006-0120830 A | 11/2006 |
| KR | 10-2008-0099469 A | 11/2008 |
| KR | 10-2009-0032273 A | 4/2009 |
| WO | WO 2006-115342 A1 | 11/2006 |

OTHER PUBLICATIONS

Japanese Office action dated Jan. 15, 2013, for corresponding Japanese Patent application 2010-135039, (2 pages).
Patent Abstracts of Japan, and English machine translation of Japanese Publication 2001-043902, (10 pages).
KIPO Office Action dated Jun. 30, 2011 for Korean priority Patent application 10-2009-0115143, 4 pages.
Patent Abstract of Japan, and English Machine translation of Japan Publication 2002-141112, 9 pages.
Full English Machine Translation of JP 2002-056900, 8 pages.
Japan Office Action dated Aug. 21, 2012 corresponding to JP 2010-0135039, 1 page.
KIPO Notice of Allowance dated Nov. 21, 2011, in Korean application 10-2009-0115143, 5 pages.
JPO Office action dated Sep. 10, 2013, for corresponding Japanese Patent application 2010-135039, (3 pages).
Patent Abstracts of Japan, and English machine translation of Japanese Publication 2000-308274 dated Nov. 2, 2000, (22 pages).

\* cited by examiner

BATTERY PACK CAPABLE OF PREVENTING BATTERY CELL FROM HIGH-TEMPERATURE SWELLING AND METHOD THEREOF

CROSS-REFERENCE TO RELATED APPLICATION

This application claims priority to and the benefit of Korean Patent Application No. 10-2009-0115143, filed on Nov. 26, 2009, the entire content of which is incorporated herein by reference.

BACKGROUND

1. Field

One or more embodiments of the present invention relate to a battery pack capable of preventing or protecting a battery cell from high-temperature swelling and a method thereof.

2. Description of the Related Art

In general, a battery pack includes a plurality of battery cells, charge/discharge switches for preventing or protecting the over-charge/over-discharge of the battery cells, and a control unit controlling the charge/discharge switches.

SUMMARY OF THE INVENTION

Aspects of embodiments of the present invention are directed toward a battery pack capable of preventing (or protecting) its battery cell from high-temperature swelling and a method thereof.

An embodiment of the present invention provides a method for protecting a battery cell from high-temperature swelling, the method includes: sensing a temperature and a voltage of the battery cell; determining whether the sensed temperature of the battery cell exceeds a reference temperature; determining whether the sensed voltage of the battery cell exceeds a reference voltage, when the sensed temperature of the battery cell exceeds the reference temperature; and self-discharging the battery cell in a charge/discharge/standby mode when the sensed voltage of the battery cell exceeds the reference voltage.

The reference temperature may be between about 45° C. and about 70° C.

The reference voltage may be about 3.85V.

The self-discharging of the battery cell may include discharging the battery cell at a rate between about 0.1 C and about 2 C.

The self-discharging of the battery cell may include discharging the battery cell at a rate between about 0.1 C and about 0.5 C.

The self-discharging of the battery cell may be performed when a remaining capacity of the battery cell is between about 50% and about 100%.

The self-discharging of the battery cell may be performed until a remaining capacity of the battery cell is decreased to about 50%.

The self-discharging of the battery cell may be performed until the sensed voltage of the battery cell is decreased to about 3.8V.

The self-discharging of the battery cell may include: discharging the battery cell; determining whether a capacity of the battery cell is less than about 50%; and determining whether the sensed voltage of the battery cell is less than about 3.8V, when the capacity of the battery cell is less than about 50%, wherein the discharging of the battery cell is stopped when the capacity of the battery cell is less than about 50%, and wherein the discharging of the battery cell continues when the voltage of the battery cell is greater than about 3.8V.

Another embodiment of the present invention provides a battery pack for protecting a battery cell from high-temperature swelling, the battery pack includes: a battery cell; a temperature sensor for sensing a temperature of the battery cell; a self-discharge unit coupled electrically to the battery cell and configured to self-discharge the battery cell; and a control unit for controlling the self-discharge unit in a charge/discharge/standby mode in accordance with the sensed temperature.

A charge switching element may be coupled electrically to a main current path of the battery cell, wherein the control unit controls the charge switching element and the self-discharge unit independently.

The self-discharge unit may include a first discharge resistor and a self-discharge switching element, the first discharge resistor and the self-discharge switching element being coupled in series to each other, and the self-discharge switching element and the first discharge resistor are coupled in parallel to the battery cell.

The self-discharge unit may further include a light-emitting diode coupled between the self-discharge switching element and the first discharge resistor.

A second discharge resistor may be coupled in parallel to the self-discharge switching element or the first discharge resistor.

The temperature sensor may include a thermistor and a voltage-dividing resistor coupled to the thermistor.

The control unit may be configured to enable the self-discharge unit in the charge/discharge/standby mode when the sensed temperature of the battery cell exceeds a reference temperature and a sensed voltage of the battery cell exceeds a reference voltage.

The control unit may be configured to enable the self-discharge unit if a remaining capacity of the battery cell is between about 50% and about 100%.

The battery pack may be mounted with a navigation device.

The battery pack may be mounted with an electronic device for a vehicle.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

The control unit of a battery pack senses the voltage of the battery cell to determine whether the battery cell is over-charged/over-discharged. If the battery cell is over-charged, the control unit turns off the charge switch to stop a charge operation. If the battery cell is over-discharged, the control unit turns off the discharge switch to stop a discharge operation.

However, if the charged battery cell is exposed to a high temperature for a long time, a large amount of gas is generated in the battery cell. Accordingly, the battery cell swells and leaks liquid, thus degrading the stability and reliability of the battery pack.

For example, in general, because a navigation device, one of the electronic devices for a vehicle, may be always connected to a power line, a battery cell of the navigation device may be always charged. Thus, if the internal temperature of the vehicle rises suddenly in summer, a large amount of gas may be generated in the battery cell of the navigation device, so that the battery cell may excessively swell and leak liquid.

Figure 1:
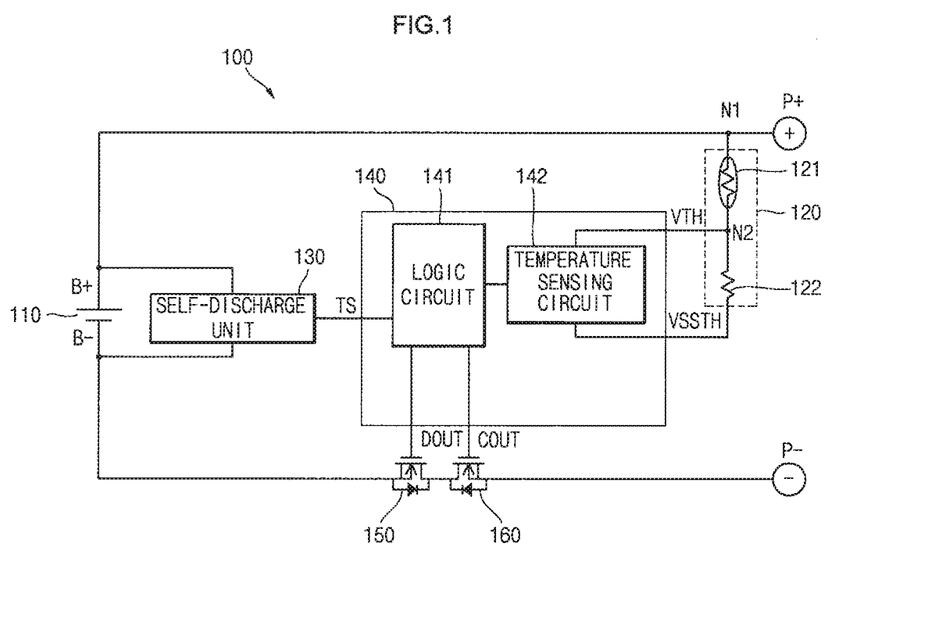
FIG. 1 is a block diagram of a battery pack according to an embodiment of the present invention.

FIG. 1 is a block diagram of a battery pack 100 according to an embodiment of the present invention.

Referring to FIG. 1, the battery pack 100 includes a battery cell 110, a temperature sensor 120, a self-discharge unit 130, a control unit 140, a discharge switch 150, and a charge switch 160. Also, the battery pack 100 includes a pack positive terminal P+ and a pack negative terminal P− that are electrically coupled/disconnected to/from a charger or an external load.

The battery cell 110 is chargeable/dischargeable and includes a cell positive terminal B+ and a cell negative terminal B−. The battery cell 110 may be any one of a lithium ion battery cell, a lithium polymer battery cell, and equivalents thereof, to which the inventive concept is not limited. The cell positive terminal B+ is electrically coupled to the pack positive terminal P+, and the cell negative terminal B− is electrically coupled to the pack negative terminal P− through the discharge switch 150 and the charge switch 160. A path between the cell positive terminal B+ and the pack positive terminal P+, and a path between the cell negative terminal B− and the pack negative terminal P− are charge/discharge current paths, which may be defined as large (or main) current paths.

The temperature sensor 120 is installed at or about the battery cell 110 to sense the temperature of the battery cell 110, convert the sensed temperature into an electrical signal and input the electrical signal to the control unit 140. The temperature sensor 120 may include a thermistor 121 and a voltage-dividing resistor 122. As is well known in the art, the thermistor 121 has a resistance value varying with temperature. Also, the voltage-dividing resistor 122 is used to divide a voltage. That is, the thermistor 121 has one terminal coupled electrically to a node N1 between the cell positive terminal B+ and the pack positive terminal P+, and the other terminal coupled electrically to the voltage-dividing resistor 122. The voltage-dividing resistor 122 has one terminal coupled electrically to the thermistor 121, and the other terminal coupled electrically to the control unit 140. Also, a node N2 between the thermistor 121 and the voltage-dividing resistor 122 is coupled to a VTH terminal of the control unit 140, and the voltage-dividing resistor 122 is coupled to a VSSTH terminal of the control unit 140. Herein, as is well known in the art, the resistance value of the thermistor 121 decreases with an increase in temperature. Therefore, as temperature increases, the thermistor 121 increases a voltage inputted to the VTH terminal. Also, the voltage-dividing resistor 122 may be selected (e.g., suitably selected) for the range of temperatures to be sensed. That is, the resistance value of the voltage-dividing resistor 122 may be adjusted to control the range of temperatures to be sensed.

The self-discharge unit 130 is coupled in parallel to the positive terminal B+ and the negative terminal B− of the battery cell 110. Also, the self-discharge unit 130 is electrically coupled to a TS terminal of the control unit 140. Thus, the self-discharge unit 130 operates/stops according to a control signal of the control unit 140. The self-discharge unit 130 forcibly discharges the battery cell 110 to reduce the capacity or voltage of the battery cell 110. The configuration and operation of the self-discharge unit 130 will be described later in more detail.

The control unit 140 is electrically coupled to the temperature sensor 120 and the self-discharge unit 130. Further, a voltage sensor and a current sensor may also be coupled to the control unit 140 to sense the voltage and current of the battery cell 110. The voltage sensor and the current sensor are suitable sensors in the art. According to a temperature value received from the temperature sensor 120, the control unit 140 controls the self-discharge unit 130 in a charge/discharge/standby mode to self-discharge the battery cell 110. Specifically, if the temperature of the battery cell 110 exceeds a reference temperature, the voltage of the battery cell 110 exceeds a reference voltage, and/or the capacity of the battery cell 110 exceeds a reference capacity, the control unit 140 enables the self-discharge unit 130 to forcibly discharge the battery cell 110. This prevents (or protects from) the high-temperature swelling and liquid leakage of the battery cell 110.

The control unit 140 includes a logic circuit 141 and a temperature-sensing circuit 142. The logic circuit 141 is electrically coupled to the self-discharge unit 130 through the TS terminal. Also, the temperature-sensing circuit 142 is electrically coupled to the VTH terminal and the VSSTH terminal to convert the sense value of the temperature sensor 120 into an electrical signal and input the electrical signal to the logic circuit 141. That is, the logic circuit 141 enables the self-discharge unit 130 to discharge the battery cell 110 through the TS terminal, if the temperature sensed by the temperature-sensing circuit 142 exceeds a reference temperature, the voltage of the battery cell 110 exceeds a reference voltage, and the capacity of the battery cell 110 exceeds a reference capacity. Herein, the control unit 140 senses the voltage and current of the battery cell 110 to calculate the capacity of the battery cell 110. The capacity calculation method, as well as the voltage sensor and the current sensor for the battery cell 110, are suitable sensors and methods in the art.

Herein, the capacity of the battery cell 110 may not be considered. That is, the logic circuit 141 may enable the self-discharge unit 130 through the TS terminal if the temperature sensed by the temperature-sensing circuit 142 exceeds the reference temperature and the voltage of the battery cell 110 exceeds the reference voltage. In this case, the swelling and liquid leakage of the battery cell 110 can be prevented (or reduced) more actively, without sacrificing the capacity of the battery cell 110.

The charge switch 150 and the discharge switch 160 are electrically coupled between the cell negative terminal B− and the pack negative terminal P−. The discharge switch 150 has a source coupled to the cell negative terminal B−, a gate coupled to a DOUT terminal of the control unit 140, and a drain coupled to a drain of the charge switch 160. Also, a body diode with a forward direction from the cell negative terminal B− to the pack negative terminal P− is coupled in parallel to the discharge switch 150. The charge switch 160 has a source coupled to the pack negative terminal P−, a gate coupled to a COUT terminal of the control unit 140, and the drain coupled to the drain of the discharge switch 150. Also, a body diode with a forward direction from the pack negative terminal P− to the cell negative terminal B− is coupled in parallel to the charge switch 160.

If it is determined that the battery cell 110 is discharged to (or has) an over-discharge voltage, the control unit 140 outputs a control signal through the DOUT terminal to the gate of the discharge switch 150 to turn off the discharge switch 150. Accordingly, the discharge operation of the battery cell 110 is stopped. Also, the battery cell 110 can be charged by the body diode of the discharge switch 150. The same operation is also applicable if the battery cell 110 has an over-discharge current.

If it is determined that the battery cell 110 is charged to (or has) an over-charge voltage, the control unit 140 outputs a control signal through the COUT terminal to the gate of the charge switch 160 to turn off the charge switch 160. Accordingly, the charge operation of the battery cell 110 is stopped. Also, the battery cell 110 can be discharged by the body diode of the charge switch 160. The same operation is also applicable if the battery cell 110 has an over-charge current.

Herein, the discharge switch 150 and the charge switch 160 are controlled substantially by the logic circuit 141. That is, the logic circuit 141 controls the self-discharge unit 130, the discharge switch 150, and the charge switch 160 substantially independently. In other words, the logic circuit 141 controls the self-discharge unit 130 independently, regardless of whether the discharge switch 150 or the charge switch 160 is turned on or off. To this end, the self-discharge unit 130 and the discharge switch 150, or the self-discharge unit 130 and the charge switch 160 may not be electrically coupled to each other. That is, the TS terminal, the DOUT terminal and the COUT terminal of the control unit 140 are not electrically coupled to each other.

Although it has been illustrated in FIG. 1 that the type of the discharge switch 150 and the charge switch 160 is an N-channel field effect transistor (FET), the inventive concept it not limited thereto. For example, the type of the discharge switch 150 and the charge switch 160 may be any one of a P-channel FET, an insulated gate bipolar transistor (IGBT), and equivalents thereof.

In a method according to an exemplary embodiment of the present invention, the battery cell 110 is self-discharged if the temperature, voltage and capacity of the battery cell 110 satisfy conditions (e.g., predetermined conditions). For example, the battery cell 110 may be forcibly discharged if the temperature of the battery cell 110 exceeds about 45° C. to about 70° C., the voltage of the battery cell 110 exceeds about 3.85V, and the capacity of the battery cell 110 is about 50% to about 100%. Accordingly, the swelling and liquid leakage of the battery cell 110 can be prevented or reduced. Also, the stability and reliability of an electronic device mounted with the battery pack 100 may be further improved. In addition, the temperature range, the voltage range, and the capacity range may vary depending on the type, shape, structure and capacity of the battery cell, to which the inventive concept is not limited.

Figure 2A:
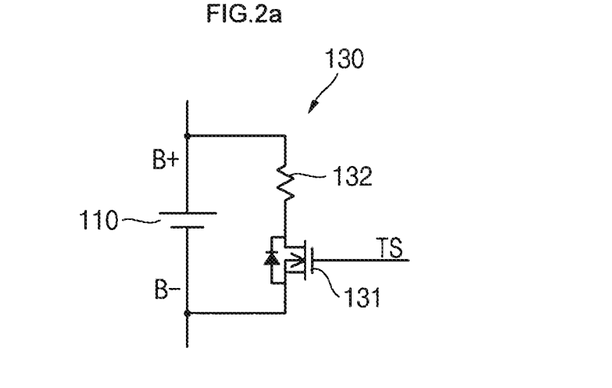
FIG. 2A is a circuit diagram of a self-discharge unit of a battery pack according to an embodiment of the present invention.
Figure 2B:
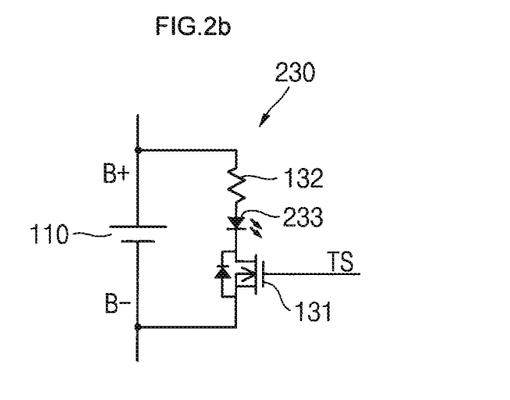
FIG. 2B is a circuit diagram of a self-discharge unit of a battery pack according to another embodiment of the present invention.
Figure 2C:
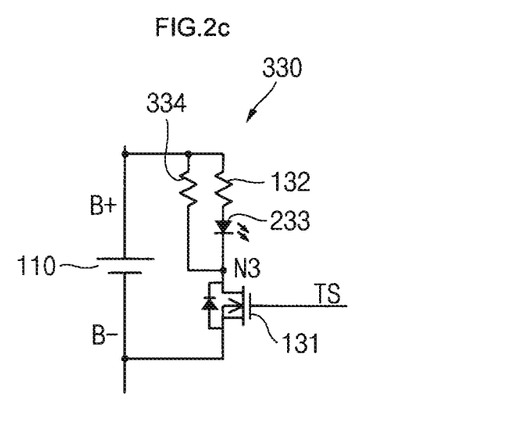
FIG. 2C is a circuit diagram of a self-discharge unit of a battery pack according to another embodiment of the present invention.

FIG. 2A is a circuit diagram of a self-discharge unit 130 of a battery pack according to an embodiment of the present invention. FIG. 2B is a circuit diagram of a self-discharge unit 230 of a battery pack according to another embodiment of the present invention. FIG. 2C is a circuit diagram of a self-discharge unit 330 of a battery pack according to another embodiment of the present invention.

Referring to FIG. 2A, the self-discharge unit 130 includes a discharge switching element 131 and a discharge resistor 132. For example, the discharge switching element 131 may be an N-channel FET, to which the inventive concept is not limited.

The discharge switching element 131 has a source coupled electrically to the cell negative terminal B− of the battery cell 110, a drain coupled electrically to the discharge resistor 132, and a gate coupled electrically to the TS terminal. Also, the discharge resistor 132 has one terminal coupled to the cell positive terminal B+ of the battery cell 110, and the other terminal coupled electrically to the drain of the discharge switching element 131.

Accordingly, for example, if a high signal is inputted through the TS terminal, the N-channel FET is turned on. Thus, a current flows from the cell positive terminal B+ of the battery cell 110 through the discharge switching element 131 and the cell negative terminal B− of the battery cell 110. Accordingly, the battery cell 110 is self-discharged through the discharge resistor 132.

Referring to FIG. 2B, the self-discharge unit 230 is substantially the same as the self-discharge unit 130, but further includes a light-emitting diode (LED) 233. Here, the LED 233 may have a cathode coupled electrically to the discharge resistor 132, and an anode coupled electrically to the drain of the discharge switching element 131.

Accordingly, when the self-discharge unit 230 is enabled, the LED 233 emits light, thereby enabling a user to detect the self-discharge operation of the battery pack 100. Also, the LED 233 may further increase the self-discharge rate of the battery cell 110.

Referring to FIG. 2C, the self-discharge unit 330 is substantially the same as the self-discharge unite 230, but further includes an additional discharge resistor 334. That is, the additional discharge resistor 334 may have one terminal coupled to the cell positive terminal B+ of the battery cell 110, and the other terminal coupled to a node N3 between the LED 233 and the discharge switching element 131. The additional discharge resistor 334 further increases the self-discharge rate of the self-discharge unit 330.

Figure 3:
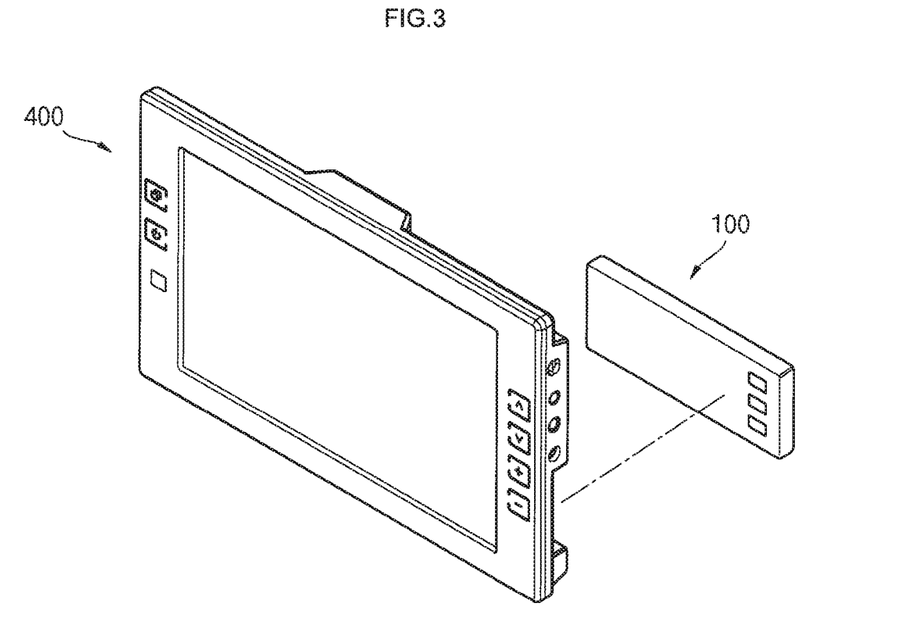
FIG. 3 is an exploded perspective view of a navigation device mounted with a battery pack according to an embodiment of the present invention.

FIG. 3 is an exploded perspective view of a navigation device 400 mounted with the battery pack 100 capable of preventing or protecting the battery cell 110 from high-temperature swelling according to an embodiment of the present invention.

Referring to FIG. 3, the battery pack 100 is mounted with or on a navigation device 400 installed in a vehicle. The battery pack 100 may also be mounted with or on various other suitable electronic devices for a vehicle.

Thus, if the battery pack 100 mounted with or on a suitable electronic device for a vehicle is exposed to high-temperature environments in summer, it is self-discharged, thereby preventing (or protecting) it from swelling and liquid leakage.

Hereinafter, an operation of the control unit 140 of the battery pack 100 will be described in more detail. Specifically, an operation of the logic circuit of the control unit 140 will be described in more detail.

Figure 4:
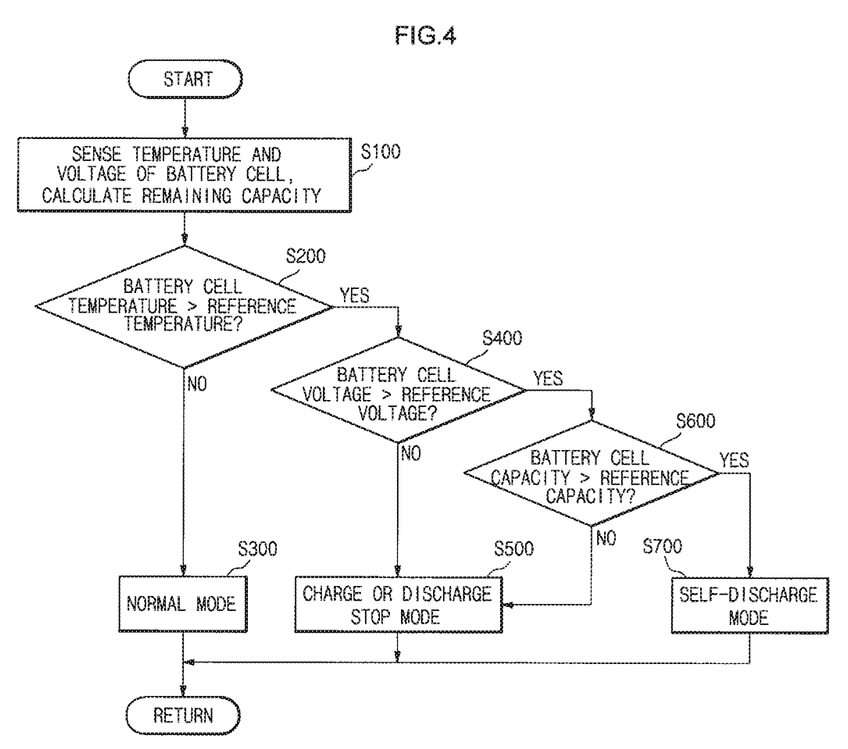
FIG. 4 is a flow chart illustrating a method according to an embodiment of the present invention.

FIG. 4 is a flow chart illustrating a method according to an embodiment of the present invention.

Referring to FIG. 4, the method is a method for preventing (or protecting) the battery cell (e.g., the battery cell 100) from high-temperature swelling. Here, the method shown in FIG. 4 includes: an operation S100 of sensing the temperature and voltage of the battery cell and calculating the remaining capacity of the battery cell; an operation S200 of determining whether the temperature of the battery cell exceeds a reference temperature; an operation S400 of determining whether the voltage of the battery cell exceeds a reference voltage; an operation S600 of determining whether the capacity of the battery cell exceeds a reference capacity; and an operation S700 of performing a self-discharge mode operation.

Herein, if it is determined in the operation S200 that the temperature of the battery cell does not exceed the reference temperature, a normal mode operation S300 is performed. Also, if it is determined in the operation S400 that the voltage of the battery cell does not exceed the reference voltage, a charge or discharge stop mode operation S500 is performed.

In the following description, it will be understood that each of the operations is performed by the control unit (i.e., the logic circuit) of the battery pack.

In the operation S100, the control unit senses the temperature of the battery cell by utilizing of the temperature sensor and senses the voltage of the battery cell by utilizing of the voltage sensor. Also, the control unit calculates the remaining capacity of the battery cell by utilizing of the voltage or current value of the battery cell.

In the operation S200, the control unit determines whether the sensed temperature of the battery cell exceeds the reference temperature. Herein, the reference temperature may be set to be between about 45° C. and about 70° C. (or between 45° C. and 70° C.), to which the inventive concept is not limited. That is, the reference temperature may vary depending on the type, shape, structure and capacity of the battery cell. In general, a lithium ion battery cell or a lithium polymer battery cell may tend to swell if the temperature exceeds about 45° C. Therefore, if the battery cell is a lithium ion battery cell or a lithium polymer battery cell, the reference temperature may be set to at least about 45° C. (or at least 45° C.).

If the temperature of the battery cell exceeds the reference temperature (in the operation S200), the operation S400 is performed.

In the operation S400, the control unit determines whether the sensed voltage of the battery cell exceeds the reference voltage. Herein, the reference voltage may be set to about 3.85V (or to 3.85V), to which the inventive concept is not limited. That is, the reference voltage may vary depending on the type, shape, structure and capacity of the battery cell. In general, a lithium ion battery cell or a lithium polymer battery cell may tend to swell if the voltage exceeds about 3.85V and the temperature exceeds about 45° C. Therefore, if the battery cell is a lithium ion battery cell or a lithium polymer battery cell, the reference voltage may be set to at least about 3.85V.

If the voltage of the battery cell exceeds the reference voltage (in the operation S400), the operation S600 is performed.

In the operation S600, the control unit determines whether the calculated capacity of the battery cell exceeds the reference capacity. Herein, the reference capacity may be set to be between about 50% and about 100% (between 50% and 100%), to which the inventive concept is not limited. That is, the reference capacity may vary depending on the type, shape, structure and capacity of the battery cell. In general, a lithium ion battery cell or a lithium polymer battery cell may swell if the capacity is about 50% to about 100%, the voltage exceeds about 3.85V and the temperature exceeds about 45° C. Therefore, if the battery cell is a lithium ion battery cell or a lithium polymer battery cell, the reference voltage may be set to be between about 50% and about 100%.

If the capacity of the battery cell exceeds the reference capacity (in the operation S600), the operation S700 is performed.

In the operation S700, the control unit performs a self-discharge operation until the voltage of the battery cell decreases to a level (e.g., a predetermined level). That is, the control unit enables the self-discharge unit 130 to self-discharge the battery cell until the voltage of the battery cell decreases to about 3.8V, to which the inventive concept is not limited. That is, the self-discharge stop voltage of the battery cell may vary depending on the type, shape, structure and capacity of the battery cell. Also, the self-discharge operation may stop (e.g., immediately stop) after the capacity of the battery cell decreases to about 50%. That is, even if the current voltage of the battery cell exceeds about 3.8V, the self-discharge operation may stop (e.g., immediately stop) after the capacity of the battery cell decreases to about 50%.

The self-discharge operation of the battery cell may be performed at a rate of between about 0.1 C and about 2 C (or between 0.1 C and 2 C). In one embodiment, the self-discharge operation of the battery cell may be performed at a rate of between about 0.1 C and about 0.5 C (0.1 C and 0.5 C). Herein, the self-discharge rate may vary depending on the type, shape, structure and capacity of the battery cell. In general, if a self-discharge rate of a lithium ion battery cell or a lithium polymer battery cell is lower than about 0.1 C, it is difficult to suppress the high-temperature swelling of the battery cell; and if the self-discharge rate is higher than about 0.5 C, the battery cell may degrade rapidly. Therefore, if the battery cell is a lithium ion battery cell or a lithium polymer battery cell, the self-discharge rate of the battery cell may be set to be between 0.1 C and about 0.5 C.

Also, the capacity of the battery cell may not be considered. That is, whether to perform the self-discharge operation may be determined considering only the temperature and voltage of the battery cell. In other words, the battery cell may be self-discharged immediately when the temperature of the battery cell exceeds the reference temperature and the voltage of the battery cell exceeds the reference voltage. This method may excessively reduce the remaining capacity of the battery cell, thus reducing the available time of the battery pack. However, in one embodiment, the capacity of the battery cell is not considered in the self-discharge operation in order to more actively prevent or reduce the swelling and liquid leakage of the battery cell although this may excessively reduce the remaining capacity or the available time of the battery pack.

As illustrated in FIG. 4, the operation S200, the operation S400, and the operation S600 may be performed in the order named, to which the inventive concept is not limited. For example, the operation S200, the operation S600, and the operation S400 may be performed in the order named. Also, the operation S400, the operation S200, and the operation S600 may be performed in the order named. Also, the operation S400, the operation S600, and the operation S200 may be performed in the order named. Also, the operation S600, the operation S200, and the operation 8400 may be performed in the order named. Also, the operation S600, the operation S400, and the operation S200 may be performed in the order named. In any case, if the conditions of the three operations are all satisfied, the self-discharge mode operation S700 is performed in a charge/discharge/standby mode.

That is, the self-discharge mode operation S700 is performed if the temperature of the battery cell exceeds a temperature (or a reference temperature) between about 45° C. and about 70° C., the voltage of the battery cell exceeds about 3.85V and the capacity of the battery cell is between about 50% and about 100%. Also, the self-discharge mode operation S700 may stop (e.g., immediately stop) when the capacity of the battery cell decreases to about 50% even if the voltage of the battery cell does not yet decrease to about 3.8V.

Figure 5:
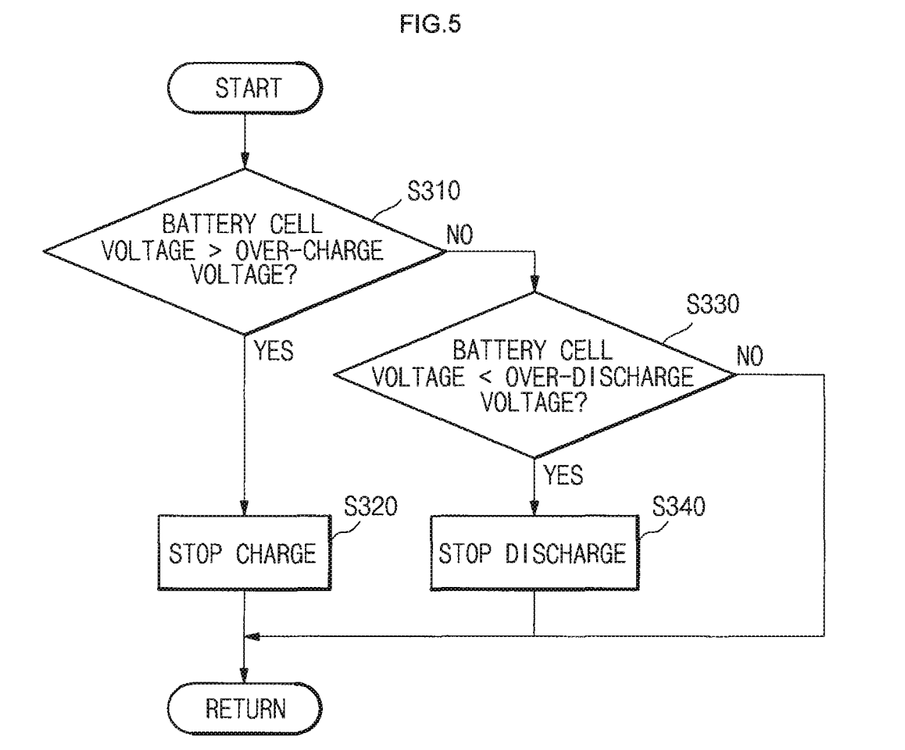
FIG. 5 is a flow chart illustrating a normal mode operation in a method according to an embodiment of the present invention.

FIG. 5 is a flow chart illustrating the normal mode operation S300 in the method according to an embodiment of the present invention.

The normal mode operation S300 is performed if the temperature of the battery cell is not higher than the reference temperature (in the operation S200 of FIG. 4).

The normal mode operation S300 includes: an operation S310 of determining whether the voltage of the battery cell is higher than an over-charge voltage; an operation S320 of stopping a charge operation if the voltage of the battery cell is higher than the over-charge voltage (in the operation S310); an operation S330 of determining whether the voltage of the battery cell is lower than an over-discharge voltage; and an operation S340 of stopping a discharge operation if the voltage of the battery cell is lower than the over-discharge voltage (in the operation S330). Herein, if the voltage of the battery cell is not lower than the over-discharge voltage (in the operation S330), the control unit may return to the operation S310.

In the operation S310, the control unit uses the voltage sensor to determine whether the voltage of the battery cell is higher than the over-charge voltage (e.g., about 4.3V).

In the operation S320, the control unit outputs a charge stop signal to the charge switch to turn off the charge switch. Accordingly, the charge operation of the battery cell is stopped. Also, even in this case, the battery cell may be discharged by the body diode of the charge switch.

In the operation S330, the control unit uses the voltage sensor to determine whether the voltage of the battery cell is lower than the over-charge voltage (e.g., about 2.3V).

In the operation S340, the control unit outputs a discharge stop signal to the discharge switch to turn off the discharge switch. Accordingly, the discharge operation of the battery cell is stopped. Also, even in this case, the battery cell may be charged by the body diode of the discharge switch.

In addition, the operation S310 and the operation S330 may be performed in the opposite order. That is, the operation S330 may be first performed and then the operation S310 may be performed.

Figure 6:
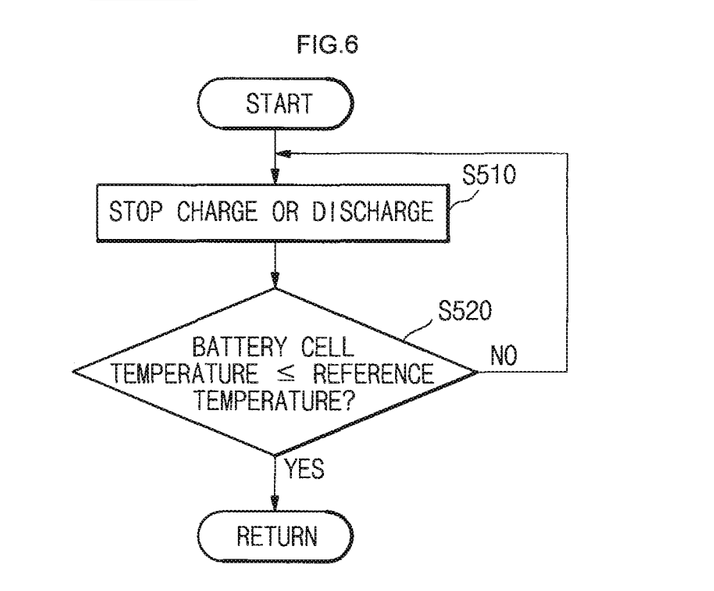
FIG. 6 is a flow chart illustrating a charge or discharge stop mode operation in a method according to an embodiment of the present invention.

FIG. 6 is a flow chart illustrating the charge or discharge stop mode operation S500 in the method according to an embodiment of the present invention.

The charge or discharge stop mode operation S500 is performed if the temperature of the battery cell exceeds the reference temperature and the voltage of the battery cell does not exceed the reference voltage (in the operation S400 of FIG. 4). The charge or discharge stop mode operation S500 is also performed if the temperature of the battery cell exceeds the reference temperature, the voltage of the battery cell exceeds the reference voltage and the capacity of the battery cell does not exceed the reference capacity (in the operation S600 of FIG. 4).

The charge or discharge stop mode operation S500 includes: a charge or discharge stop operation S510; and an operation S520 of determining whether the temperature of the battery cell is lower than or equal to the reference temperature.

In the charge or discharge stop operation S510, the control unit turns off the charge switch or discharge switch to stop the charge operation or discharge operation of the battery cell. That is, because the temperature of the battery cell exceeds the reference temperature, the charge or discharge operation of the battery cell is stopped to stabilize the battery cell.

In the operation S520, the control unit determines whether the temperature of the battery cell is lower than or equal to the reference temperature (e.g., between about 45° C. and about 70° C.).

If the temperature of the battery cell is lower than or equal to the reference temperature (in the operation S520), the charge or discharge stop mode is disabled because the battery cell is stabilized. On the other hand, if the temperature of the battery cell is higher than the reference temperature (in the operation S520), the control unit returns to the operation S510 because the battery cell is not stabilized.

Figure 7:
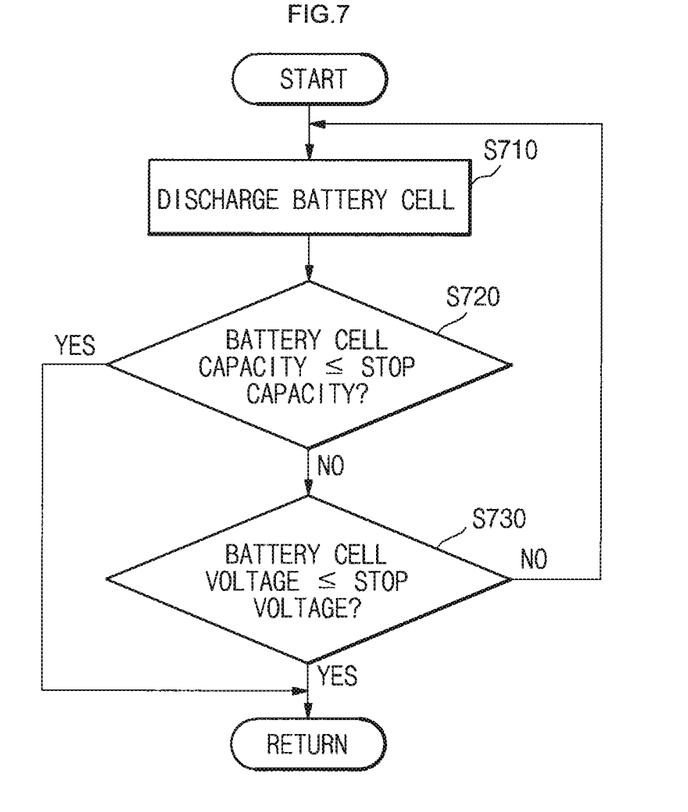
FIG. 7 is a flow chart illustrating a self-discharge mode operation in a method according to an embodiment of the present invention.

FIG. 7 is a flow chart illustrating the self-discharge mode operation S700 in the method according to an embodiment of the present invention.

The self-discharge mode operation S700 is performed if the temperature, voltage and capacity of the battery cell satisfy conditions (e.g., predetermined conditions). For example, the battery cell self-discharged is performed if the temperature of the battery cell exceeds a temperature between about 45° C. and about 70° C., the voltage of the battery cell exceeds about 3.85V, and the capacity of the battery cell is about 50% to about 100%. The capacity of the battery cell may not be considered in the self-discharge mode operation.

The self-discharge mode operation S700 includes: an operation S710 of discharging the battery cell; an operation S720 of determining whether the capacity of the battery cell is less than or equal to a stop capacity; and an operation S730 of determining whether the voltage of the battery cell is less than or equal to a stop voltage. Herein, the self-discharge mode operation S700 is performed in a charge/discharge/ standby mode of the battery cell. That is, according to an embodiment, the battery cell is self-discharged during its charge, discharge or standby mode, thereby actively preventing (or reducing) the swelling and liquid leakage of the battery cell even if the battery cell is in any condition.

In the operation S710, the control unit outputs a self-discharge signal to the self-discharge unit to self-discharge the battery cell.

In the operation S720, the control unit determines whether the capacity of the battery cell is less than or equal to about 50%. If the capacity of the battery cell is less than or equal to about 50% (in the operation S720), the control unit outputs a self-discharge stop signal to the self-discharge unit to stop (e.g., immediately stop) the self-discharge operation of the battery cell. That is, the control unit disables the self-discharge mode.

On the other hand, if the capacity of the battery cell exceeds about 50% (in the operation S720), the operation S730 is performed.

In the operation S730, the control unit determines whether the voltage of the battery cell is lower than or equal to about 3.8V. If the voltage of the battery cell is higher than about 3.8V (in the operation S730), the control unit returns to the operation S710. On the other hand, if the voltage of the battery cell is lower than or equal to about 3.8V (in the operation S730), the self-discharge operation of the battery cell is stopped. That is, the control unit disables the self-discharge mode.

In addition, the operation S720 and the operation S730 may be performed in the opposite order. That is, the operation S730 may be first performed and then the operation S720 may be performed.

As described above, in the method according to an embodiment of the present invention, the battery cell is self-discharged if the temperature, voltage and capacity of the battery cell satisfy the conditions (e.g., predetermined conditions). That is, the battery cell is forcibly discharged to about 3.8V in the charge/discharge/standby mode if the temperature of the battery cell exceeds a temperature between about 45° C. and about 70° C., the voltage of the battery cell exceeds about 3.85V and the capacity of the battery call is about between 50% and about 100%. Thus, according to an embodiment of the present invention, the swelling and liquid leakage of the battery cell is actively prevented or reduced. Also, the stability and reliability of the battery pack using the above method is further improved. Further, the inventive concept is suitable for battery packs mounted on electronic devices that are frequently used in high-temperature states (e.g., navigation devices and electronic devices for vehicles).

According to the embodiments of the present invention described above, if the temperature of the battery cell exceeds the reference temperature and the voltage of the battery cell exceeds the reference voltage, the battery cell is self-discharged, thereby preventing or reducing the high-temperature swelling or liquid leakage of the battery cell effectively. Also, the battery cell may be self-discharged while the capacity of the battery cell is between about 50% and about 100%, thereby preventing (or reducing) the high-temperature swelling or liquid leakage of the battery cell more effectively.

In addition, the self-discharge operation may be performed in the charge/discharge/standby mode, thereby securing the stability and reliability of the battery pack regardless of the operation modes of the battery pack.

While aspects of the present invention have been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for protecting a battery cell from high-temperature swelling, the method comprising:
    sensing a temperature and a voltage of the battery cell;
    calculating a remaining capacity of the battery cell;
    determining whether the sensed temperature of the battery cell exceeds a reference temperature;
    determining whether the sensed voltage of the battery cell exceeds a reference voltage in response to the sensed temperature of the battery cell exceeding the reference temperature;
    determining whether the calculated remaining capacity of the battery cell exceeds a reference capacity in response to the sensed temperature of the battery cell exceeding the reference temperature, and in response to the sensed voltage of the battery cell exceeding the reference voltage; and
    self-discharging the battery cell in a charge/discharge/standby mode when the calculated remaining capacity of the battery cell exceeds the reference capacity.

2. The method as claimed in claim 1, wherein the reference temperature is between about 45° C. and about 70° C.

3. The method as claimed in claim 1, wherein the reference voltage is about 3.85V.

4. The method as claimed in claim 1, wherein the self-discharging of the battery cell comprises discharging the battery cell at a rate between about 0.1 C and about 2 C.

5. The method as claimed in claim 1, wherein the self-discharging of the battery cell comprises discharging the battery cell at a rate between about 0.1 C and about 0.5 C.

6. The method as claimed in claim 1, wherein the self-discharging of the battery cell is performed when the calculated remaining capacity of the battery cell is between about 50% and about 100%.

7. The method as claimed in claim 1, wherein the self-discharging of the battery cell is performed until the calculated remaining capacity of the battery cell is decreased to about 50%.

8. The method as claimed in claim 1, wherein the self-discharging of the battery cell is performed until the sensed voltage of the battery cell is decreased to about 3.8V.

9. The method as claimed in claim 1, wherein the self-discharging of the battery cell comprises:
    discharging the battery cell;
    determining whether the calculated remaining capacity of the battery cell is less than about 50%; and
    determining whether the sensed voltage of the battery cell is less than about 3.8V, when the capacity of the battery cell is less than about 50%,
    wherein the discharging of the battery cell is stopped when the calculated remaining capacity of the battery cell is less than about 50%, and wherein the discharging of the battery cell continues when the voltage of the battery cell is greater than about 3.8V.

10. A battery pack for protecting a battery cell from high-temperature swelling, the battery pack comprising:
    a battery cell;
    a temperature sensor for sensing a temperature of the battery cell;
    a self-discharge unit coupled electrically to the battery cell and configured to self-discharge the battery cell; and
    a control unit for controlling the self-discharge unit in a charge/discharge/standby mode, wherein the control unit is configured to enable the self-discharge unit to self-discharge the battery cell in the charge/discharge/standby mode when a determined remaining capacity of the battery cell exceeds a reference capacity in response to a sensed temperature of the battery cell exceeding a reference temperature, and in response to a sensed voltage of the battery cell exceeding a reference voltage.

11. The battery pack as claimed in claim 10, further comprising a charge switching element coupled electrically to a main current path of the battery cell,
    wherein the control unit controls the charge switching element and the self-discharge unit independently.

12. The battery pack as claimed in claim 10, wherein the self-discharge unit comprises a first discharge resistor and a self-discharge switching element, the first discharge resistor and the self-discharge switching element being coupled in series to each other, and the self-discharge switching element and the first discharge resistor are coupled in parallel to the battery cell.

13. The battery pack as claimed in claim 12, wherein the self-discharge unit further comprises a light-emitting diode coupled between the self-discharge switching element and the first discharge resistor.

14. The battery pack as claimed in claim 13, further comprising a second discharge resistor coupled in parallel to the self-discharge switching element or the first discharge resistor.

15. The battery pack as claimed in claim 10, wherein the temperature sensor comprises a thermistor and a voltage-dividing resistor coupled to the thermistor.

16. The battery pack as claimed in claim 10, wherein the control unit is configured to enable the self-discharge unit if the calculated remaining capacity of the battery cell is between about 50% and about 100%.

17. The battery pack as claimed in claim 10, wherein the battery pack is mounted with a navigation device.

18. The battery pack as claimed in claim 10, wherein the battery pack is mounted with an electronic device for a vehicle.

* * * * *